July 2, 1929.　　　　S. J. LONERGAN　　　　1,718,970
ELECTRIC HEATER FOR HOT WATER SYSTEMS
Filed Oct. 22, 1927　　　2 Sheets-Sheet 1
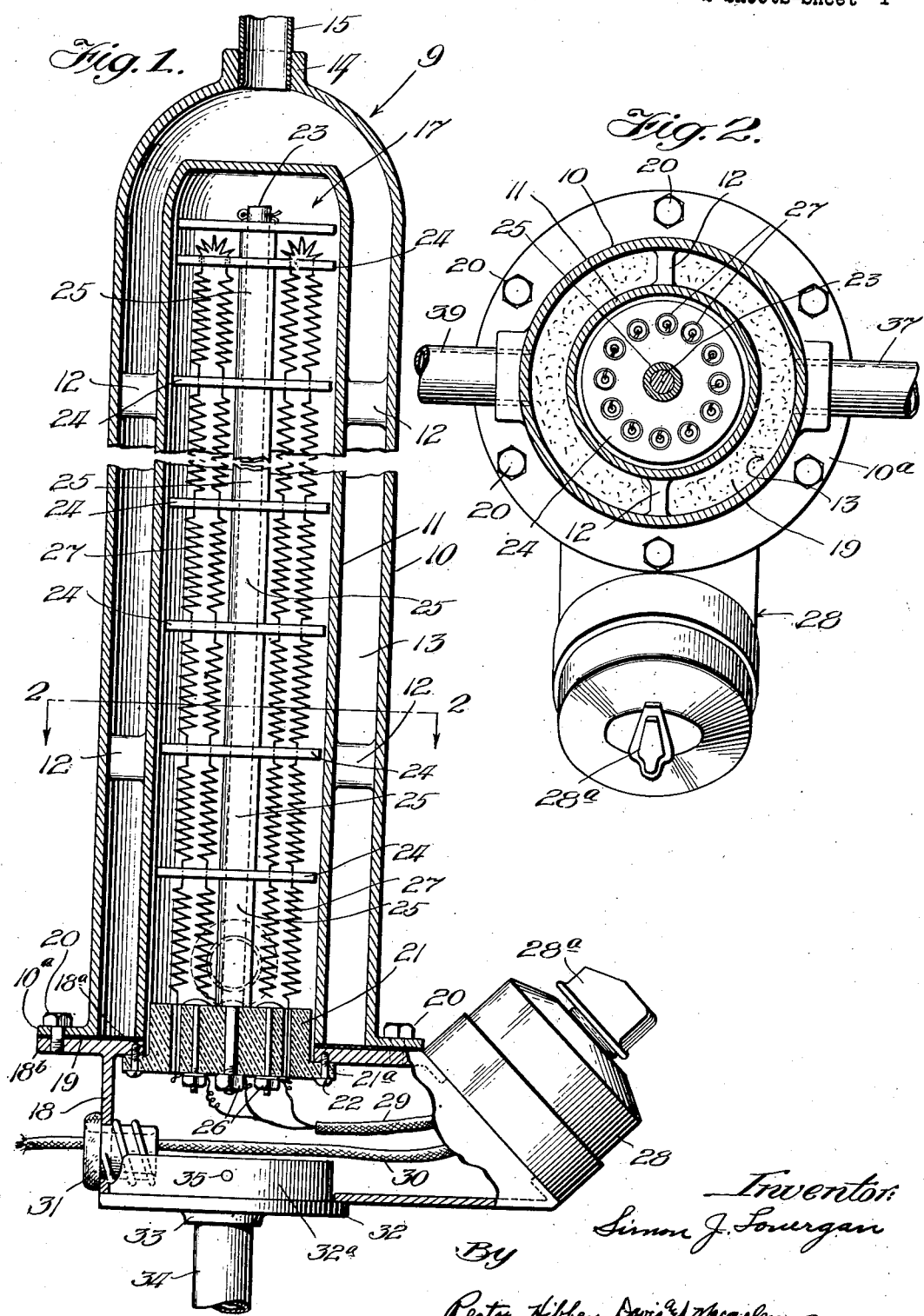

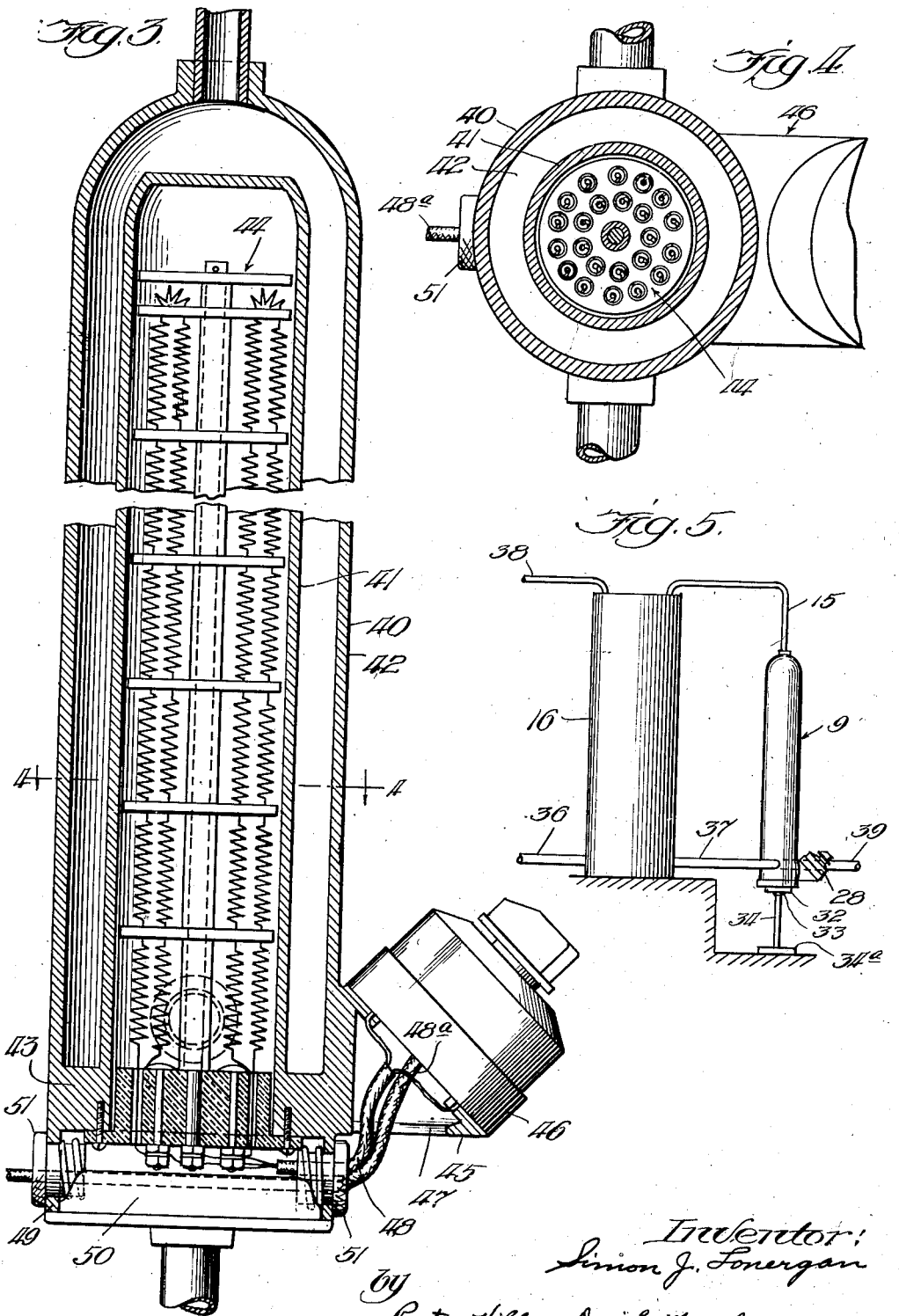

Patented July 2, 1929.

1,718,970

UNITED STATES PATENT OFFICE.

SIMON J. LONERGAN, OF LA PORTE, INDIANA, ASSIGNOR TO BASTIAN-MORLEY COMPANY, OF LA PORTE, INDIANA, A CORPORATION OF INDIANA.

ELECTRIC HEATER FOR HOT-WATER SYSTEMS.

Application filed October 22, 1927. Serial No. 227,947.

My invention relates to an electric heater for hot water systems for household or other uses and one of its objects is to provide a highly efficient heater which is simple in construction, cheap to manufacture and inexpensive to operate.

Another object is to provide a compact electric water heater embodying but a few parts all of which may be readily and quickly assembled and disassembled for thorough cleaning and repairs.

A further object is to provide an arrangement whereby collection of dirt, sediment, lime deposits, etc., upon the heating surfaces is practically eliminated thereby preventing overheating of the heating element and rendering it fully effective at all times, insuring constant maximum efficiency of the heating surfaces, and lengthening the life of the heating element.

Other objects and advantages will become apparent as this description progresses and by reference to the drawings wherein,—

Figure 1 is a vertical section through an electric heater embodying my invention;

Fig. 2 is a section taken on line 2—2 of Fig. 1;

Fig. 3 is a vertical section through a modified form of electric heater;

Fig. 4 is a section taken on line 4—4 of Fig. 2;

Fig. 5 is a diagrammatic view of a portion of one form of hot water system including an electric heater embodying my invention and a storage tank.

Referring particularly to the form of heater shown in Figures 1 and 2, I employ a heater shell 9 comprising a circular metal outer wall 10 and circular metal inner wall 11 integrally joined together and uniformly spaced apart throughout their length by a plurality of diametrically opposed arms 12 to form a water heating and circulating chamber 13 therebetween. I preferably employ four of these arms 12 arranged at two sides only of the walls, but the number of such arms and their location may be varied without departing from my invention. The outer wall 10 is open at the bottom and its lower edge is provided with a horizontal circumferential flange 10$^a$; and its upper end is curved and provided with a boss 14 having a threaded opening adapted to receive the hot water circulating pipe 15 leading to the storage tank 16 (Fig. 5). The inner wall is closed at its top and open at its bottom to receive a heating element 17 which will be more fully described hereinafter.

The heater shell 9 is carried upon a hollow circular base 18 having an opening 18$^a$ in its top of a diameter substantially the same as the inside diameter of the inner wall 11. The flat top of the base 18 has a circular projecting flange 18$^b$ to provide a sufficiently wide surface for receiving and supporting the flanged bottom edge 10$^a$ of the outer wall 10 and the lower edge of the inner wall 11. A gasket 19 of any suitable material is disposed between the base 18 and the shell, and a plurality of screws 20 freely pass through openings in the shell flange 10$^a$ and engage threaded openings in the adjacent portion of the base flange 18$^b$ to hold these parts tightly together and provide a water tight joint between the same.

The heating element may be of any desired construction but I preferably employ a unit comprising a circular and, preferably, porcelain base 21 adapted to pass through the opening in the top of the base 18 and within the inner wall 11 and having a circumferential flange 21$^a$ around its lower edge adapted to engage the lower side of the top of base 18 where it is held in place by a plurality of screws 22 which freely pass through the flange and engage threaded openings in the base top. This porcelain base 21 carries a central upright standard 23 over which is passed a plurality of porcelain discs 24. These discs are spaced apart by tubular pieces 25 which are passed over the standard 22 and are formed, preferably, of heat resisting material, such as Monel metal. The base 21 is also provided with suitable electric terminals 26 to which are connected electric resistance wires 27 which pass through suitable openings in and are laced upon the porcelain discs 24 as shown in Fig. 1. The terminals 26 are connected to an ordinary form of switch 28 by wires 29, the switch being carried upon a laterally extended and inclined side portion of the base 18 and is connected to a source of electric energy by wire 30 passing outwardly through an insulating bushing 31 in the opposite side of base 18. The switch is operated by the usual control button 28$^a$.

The base 18 is provided with a circular opening in its bottom adapted to receive the cylindrical inset and upright portion 32$^a$ of a cylindrical base plate or support 32; and the base 18 is adapted to rest upon the projecting part of the base plate. The base plate is further provided with a boss 33 in its bottom having a threaded opening therein which receives the upper threaded part of a supporting standard 34 of any desired length to carry the heater at the proper height. The lower part of the standard may be provided with a foot 34$^a$ which is secured to the floor. The heater is secured to the base plate 32 by suitable fastening devices passing through a plurality of openings in the side walls of the base 18 and engaging aligned openings 35 in the cylindrical upright part 32$^a$ of such base plate.

My invention provides for the use of a long heater casing with a correspondingly long water circulating chamber and heating surface, and makes possible the use of a long heating element which is so constructed that there is a low transfer of heat per square inch of heating area, along the heating surface, which insures that the electric resistance materials do not reach excessive temperatures, tending to cause their disintegration. However, the total heating effect resulting from the water passing over the entire heater surface is sufficient to heat the water to the desired extent and to cause a fast circulation of the same.

The low heating effect at any one point also prevents the usual deposit of lime, et cetera, caused by the water contacting with a highly heated surface and which would also tend to insulate such surface. Furthermore the fast circulation tends to eliminate the collection of insulating deposits on the heating surface with the total result that the heating surface is always clean and the maximum efficiency of the heater is always obtained; otherwise if deposits should form the insulating effect would cause the heating element to become overheated requiring frequent repair and replacement of the same, which would render operation and maintenance very expensive, and the heat generated would not be fully effective due to the insulation effect. My invention permits of the use of parts, as explained, which overcomes all of these objections.

In operation, with reference to Figs. 1 and 5, cold water enters the storage tank 16 through the supply pipe 36. This water is heated by passing from the tank 16 through pipe 37 to the water heating chamber 13 of the heater shell 9. As the water in this chamber is heated it circulates upwardly, in a manner well understood, and is further heated as it passes along and it finally passes through the pipe 15 to the top of the storage tank from which it may be drawn through the service pipe 38. This action takes place continuously as long as the heater is in operation, the water circulating upwardly in chamber 13 being replaced by the incoming water through pipe 37. The chamber 13 may be drained without disassembly of the parts through pipe 39 which may be normally closed by any well known form of valve (not shown).

In the modified form shown in Figures 3 and 4, the outer and inner walls 40 and 41 are uniformly spaced apart throughout their length to form a long water heating and circulating space 42, and are integrally formed and joined at their lower edges as at 43. The inner wall is open at its lower end to receive the heating unit 44 which is similar in all respects to that of Fig. 1. In this form the support 45 for the switch 46 is formed integrally with the outer wall, such support being inclined to make the switch readily accessible. The switch support has an opening 47 in its bottom through which the wires 48 and 48$^a$ pass. The bottom part of the shell is extended downwardly to provide an integral circular skirt 49 having an open bottom adapted to receive a base plate 50 similar to that described in connection with Figure 1. This skirt has suitable bushings 51 formed, preferably, of porcelain through which the electric heater and line wires pass. This form of heater may be associated with the storage tank as shown in Fig. 5, and its operation is the same as the form of Figure 1.

From the foregoing it will be readily seen that I employ a very small number of parts compactly arranged and which may be readily and quickly taken apart, and thoroughly cleaned; it is not necessary to detach all parts for cleaning of the water chamber and, in each instance, the heating element need not be disturbed except in the case of repair or replacement of the same; and such arrangement enables the use of a heating element adapted to generate only a small amount of heat at any one point which, with the long heating surface, heats the water to the desired extent, keeps the water in rapid circulation and prevents the accumulation of insulating lime, and other, deposits on the heating surface.

While I have shown and described only two forms of my invention it is to be understood that further changes and modifications may be made therein without departing from the scope and spirit of my invention as defined by the claims which follow.

I claim:

1. In an electric water heater, the combination of a shell having a cylindrical outer wall, a cylindrical inner wall integrally carried by and spaced from said outer wall throughout its length by a plurality of arms located intermediate the ends of said walls, the spacing of said walls providing a circular water heating and circulating chamber, a base for said shell, a heating element carried by said base and extending within and substantially throughout said inner wall, a switch carried by said base and connected to said heating element and to a source of electric energy, and a member carried by an upright standard and upon which said base is fixed for supporting said heater.

2. In an electric heater, the combination of a shell having a long outer cylindrical wall open at its bottom and a long inner cylindrical wall open at its bottom and integrally connected to said outer wall intermediate its length by a plurality of spaced arms, said inner wall forming with said outer wall a water heating and circulating chamber; a member attached to said outer wall and serving as a closure for the lower end of said chamber; a heating element of low intensity extending within and throughout said inner wall, said element including a base supported by said member; an electric switch carried by said member and connected to said element and to a source of electric energy; and a support connected to said member for carrying the shell.

3. In an electric heater the combination of a shell having a long cylindrical outer wall having a rounded top with a water outlet therein, a long cylindrical inner wall smaller in diameter and shorter than said outer wall to provide a water heating and circulating space therebetween, a base member along the lower open ends of said walls and cooperating therewith for closing the water space therebetween, a heating element extending within and substantially throughout said inner wall and including a flanged base, the flanged portion of said base being secured to said chamber closure member; a support carried by an upright standard and having a portion removably attached to said base member for carrying the heater as a whole.

4. In an electric heater, the combination of a heater casing comprising an outer cylindrical wall, another cylindrical wall of lesser diameter and length within said outer wall forming a water heating and circulating space therebetween, said walls being integrally connected; a heating element extending within and substantially throughout said inner wall and including a cylindrical base part extending within said inner wall and having a flange connected to said casing for supporting said element in position; and a support mounted upon a vertical standard and associated with said casing for carrying the heater as a whole.

5. In an electric water heater, the combination of a casing comprising two integrally connected shells one of lesser diameter and length and disposed within the other to form a water circulating space therebetween which is of inverted U-shape in vertical section, said outer shell having a circumferential flange at its lower edge and the lower edge of the inner shell terminating flush therewith, a member having a flat top secured against said flange and lower shell edges for closing said water space; a heating element extending through an opening in the flat top of said member and within and substantially throughout said inner shell and having a base with a flange adapted to be connected to said flat top; a switch support on said member carrying a switch connected to said element and to a source of electric energy; and a supporting standard having an upright cylindrical part passing through an opening in said member and attached thereto, said part having a lateral extension at its lower edge upon which said member rests.

6. In an electric heater, the combination of a casing comprising two integrally joined cylindrical walls, one of lesser diameter and length and disposed within the other to form a water heating and circulating space therebetween which is of inverted U-shape in vertical section, said outer wall having a circumferential flange at its lower edge; a member extending from the lower edge of said inner wall across the end of said water space and secured to said flange for sealing said water space; an outlet in the outer wall at the top of said space; an inlet in said outer wall at the bottom of said space; a heating element passing within and substantially throughout said inner shell and having a base with a flange adapted to be secured to said member; a switch support integral with said member and carrying a switch connected to said element and to a source of electric energy; and a supporting standard having an upright cylindrical part passing through an opening in said member and a lateral extension upon which said member rests.

In testimony whereof, I have subscribed my name.

SIMON J. LONERGAN.